UNITED STATES PATENT OFFICE.

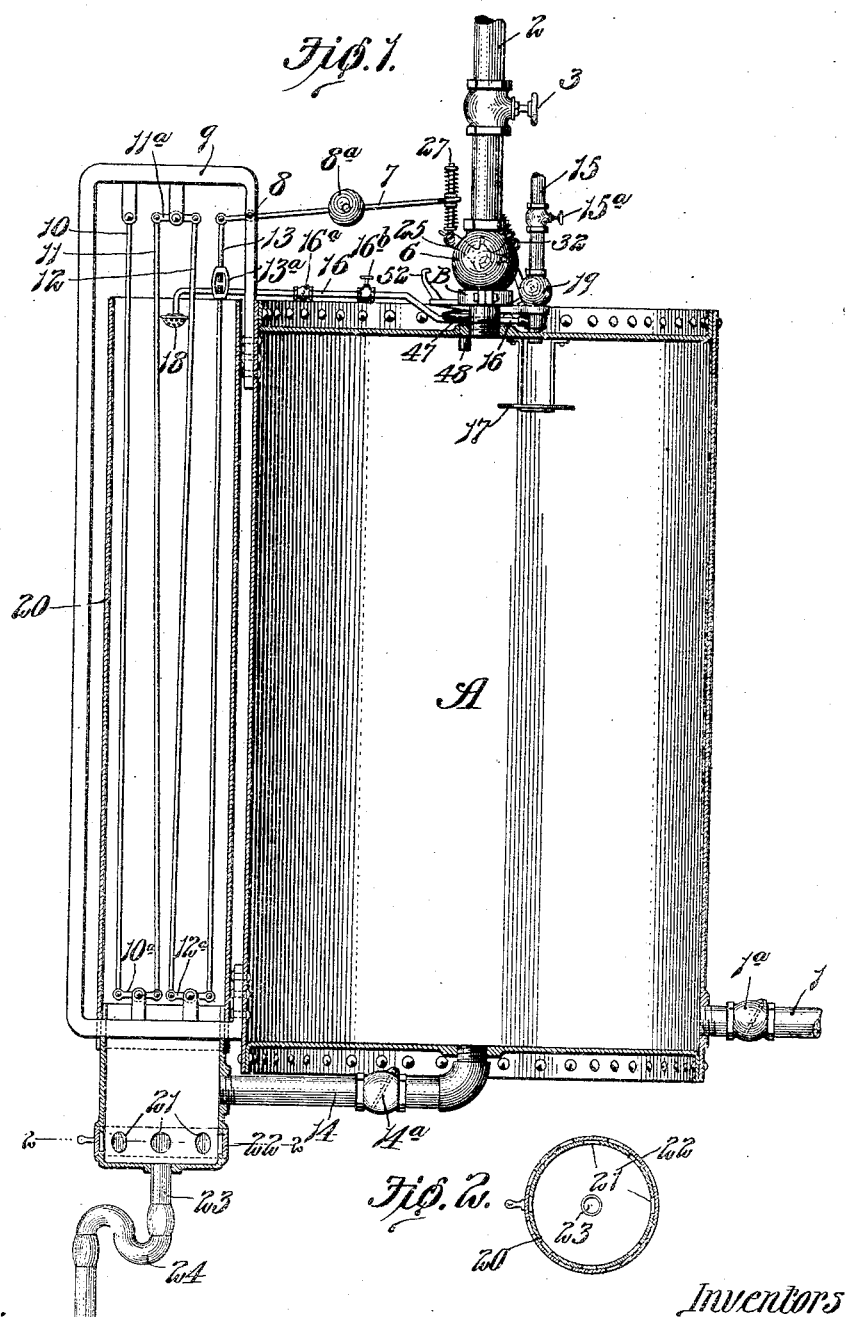

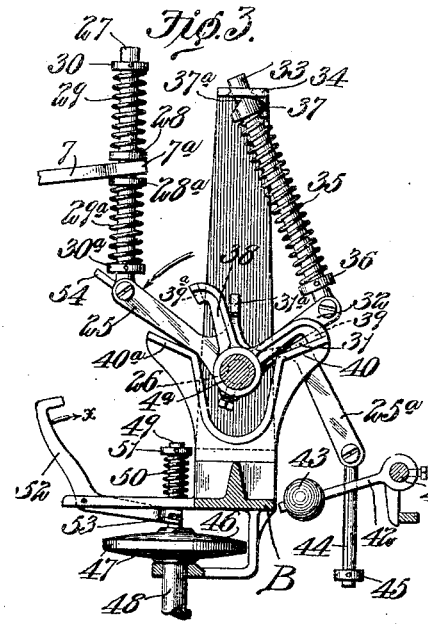
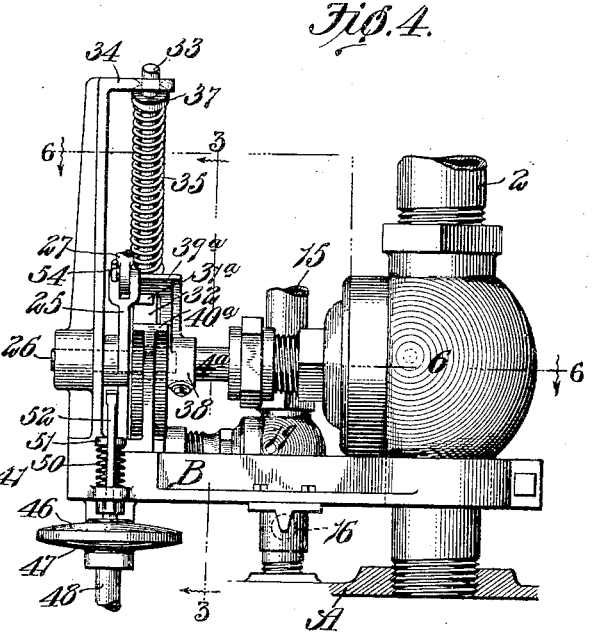
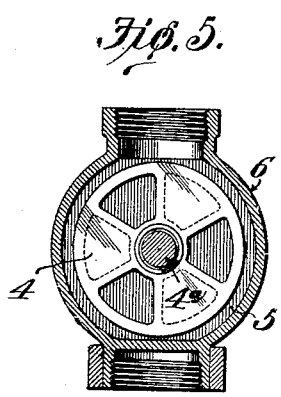
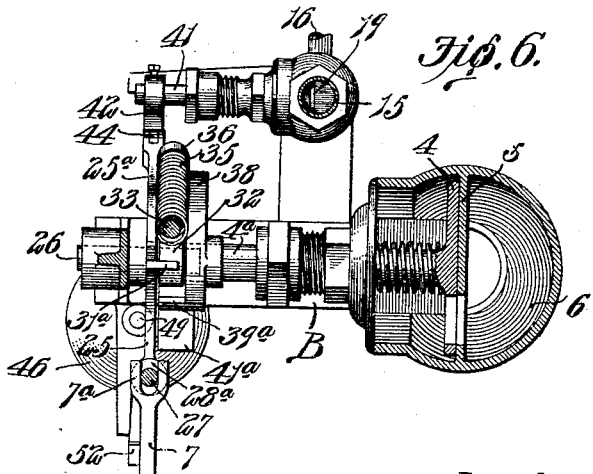

JAMES L. SPARKS AND EDWARD R. EDDINS, OF ST. LOUIS, MISSOURI, ASSIGNORS TO AUTOMATIC VACUUM PUMP COMPANY, OF ST. LOUIS, MISSOURI, A CORPORATION OF MISSOURI.

VACUUM-PUMP.

No. 929,799.  Specification of Letters Patent.  Patented Aug. 3, 1909.

Application filed April 17, 1908. Serial No. 427,600.

*To all whom it may concern:*

Be it known that we, JAMES L. SPARKS and EDWARD R. EDDINS, both citizens of the United States, residing at St. Louis, Missouri, have invented a certain new and useful Improvement in Vacuum - Pumps, of which the following is a full, clear, and exact description, such as will enable others skilled in the art to which it appertains to make and use the same, reference being had to the accompanying drawings, forming part of this specification, in which—

Figure 1 is a vertical sectional view of a vacuum pump constructed in accordance with our invention; Fig. 2 is a cross sectional view taken on the line 2—2 of Fig. 1; Fig. 3 is an enlarged vertical cross sectional view of the valve-operating mechanism, taken on the line 3—3 of Fig. 4; Fig. 4 is an enlarged side elevational view of the valve-operating mechanism; Fig. 5 is a vertical sectional view taken through the casing of the steam valve; and Fig. 6 is a horizontal sectional view taken on approximately the line 6—6 of Fig. 4.

This invention relates to vacuum pumps.

One object of our invention is to provide a pump comprising a tank or cylinder provided with an inlet and an outlet opening, means for introducing steam into said tank to force air or a fluid out of same and also create a vacuum in said cylinder when the steam condenses, and means operated by the heat of said steam as it exhausts from said cylinder for actuating the valve that controls the admission of steam into the cylinder.

Another object of our invention is to provide a pump comprising a tank or cylinder, a valve for admitting steam into said cylinder to discharge the contents thereof and also create a vacuum in said cylinder when the steam condenses, and an actuating mechanism for said valve which is so constructed that the valve will close when the contents of the cylinder is discharged irrespective of the time it takes to discharge said contents.

Another object of our invention is to provide a pump comprising a tank or cylinder, a valve for controlling the admission of steam into said tank to displace the contents thereof and create a vacuum in the tank when said steam condenses, mechanism for automatically operating said valve, and means for causing said valve to remain closed so long as a certain vacuum exists in the tank.

Another object of our invention is to provide a pump comprising a tank or cylinder, a valve for permitting steam to pass through said cylinder, and a thermostat arranged in the path of movement of the steam as it exhausts from said cylinder for operating said valve. And still another object of our invention is to provide a valve-operating mechanism comprising an actuating member for the valve, and means for gradually storing up energy in said actuating member and then releasing it so that it can impart a quick and sudden movement to the stem of the valve to open and close the valve. Other advantages and desirable features of our invention will be hereinafter pointed out.

Referring to the drawings which illustrate one form of our invention, A designates an air-tight tank or cylinder, 1 designates a pipe that leads into said cylinder, and 1$^a$ designates a check valve in said pipe, said pipe being adapted to be connected to a device or apparatus in which a vacuum is to be created or a supply of water or liquid that is to be moved. A pipe 2 leads into the upper end of said tank for introducing steam into same, and a cock 3 is arranged in said pipe for controlling the passage of steam therethrough. The pipe 2 is also provided with a valve 4 of any preferred design for admitting the steam into the tank A. We have herein shown an oscillating valve provided with a plurality of ports which aline with ports in a partition 5 on the inside of the valve casing 6 when the valve is in one position but it will, of course, be obvious that other types of valves could be used without departing from the spirit of our invention.

The mechanism for operating the steam valve comprises an actuating lever 7 and devices hereinafter described which impart a quick and sudden movement to the stem 4$^a$ of the valve 4. Said actuating lever is pivotally connected at 8 to a stationary support 9 and the short end of said lever is connected to a thermostat that controls the movements of said lever, the opposite end of said lever being connected to the valve-operating devices.

In the construction herein shown the actuating lever 7 is provided with a weight 8ª which causes said lever to move downwardly and close the steam valve when the thermostat is heated and expands, the cooling off or contraction of the thermostat causing the lever 7 to move upwardly and open the valve, as hereinafter described.

We have herein shown a thermostat that consists of a number of metal rods 10, 11, 12 and 13 arranged in the path of movement of the steam that exhausts from the cylinder A through a pipe 14 that leads from the bottom of the cylinder. The rod 10 is connected at its upper end to the support 9 and at its lower end to a lever 10ª, to the opposite end of which the rod 11 is connected. The upper end of the rod 11 is connected to a lever 11ª and the upper end of the rod 12 is connected to the opposite end of said lever 11ª. The lower end of rod 12 is connected to a lever 12ª and the rod 13 is connected at its lower end to the opposite end of said lever 12ª and at its upper end to the actuating lever 7, as shown clearly in Fig. 1. The rod 13 is preferably provided with a turn-buckle 13ª that enables said rod to be lengthened or shortened. When the steam that exhausts from the tank A comes in contact with said metal rods it will heat said rods and thus cause them to expand or stretch, thereby permitting the weight 8ª to move the actuating lever 7 downwardly.

As previously stated, the pump herein shown is adapted to be used for pumping water or sucking air out of any device, and, in fact, can be used for any purpose where a vacuum is required. If, for example, the pump is to be used for raising water, the pipe 1 will be connected to the water supply so that water will flow into the tank A when a vacuum is created therein. To start the pump we admit steam, preferably low pressure steam, into the tank through the pipe 2 and thus cause air or any fluid that is in the tank to be discharged through the pipe 14, said pipe 14 being provided with a check valve 14ª that prevents air from entering the tank. When said steam condenses a vacuum will be created in the tank A which causes the water to flow through the pipe 1 into the tank. As the steam exhausts from said tank through the pipe 14 it heats the rods which form the thermostat and thus permits the actuating lever 7 to move downwardly and close the steam valve 4, thereby automatically cutting off the supply of steam to the tank A. When the rods which form the thermostat cool off the contraction of said rods will move the actuating lever 7 upwardly and thus open the steam valve 4. As the steam rushes into the tank it forces the water out of same through the pipe 14 and when said steam condenses a vacuum will be created which draws another charge of water into the tank, these operations being repeated automatically due to the fact that the heat of the exhaust steam causes the thermostat to expand and permit the valve-operating mechanism to close the valve 4, and the cooling off or contraction of the metal rods of the thermostat actuates the mechanism which opens the valve 4.

We prefer to introduce a spray of water into the tank A to cause the steam to condense quickly and also subject the thermostat to a spray of water to cause it to cool off quickly, and to accomplish this we use a water pipe 15 that extends into the upper end of the tank A and a branch 16 leading from said pipe to a point adjacent the thermostat. The water from the pipe 15 discharges onto a plate 17 arranged inside of the tank, said plate operating to deflect the water laterally and separate it into a fine spray which falls onto the steam. The branch 16 is provided with a spraying nozzle 18 of any suitable design that will project a spray downwardly onto the rods which form the thermostat. Said branch 16 is provided with a check-valve 16ª that prevents air from passing through said branch into the tank and also a cock 16ᵇ that can be manipulated to regulate the quantity of water that is discharged onto the thermostat. In fact, this cock 16ᵇ controls the time of operation of the machine for when a great quantity of water is discharged onto the thermostat said thermostat will cool off more quickly than when a small amount of water is discharged onto same and thus cause the steam valve to open at shorter intervals. The pipe 15 is provided with a cock 15ª and also a valve 19 that is operated by the mechanism which operates the steam valve 4, said operating mechanism being so constructed that the water valve will open at approximately the same time the steam valve closes and also close at approximately the same time said steam valve opens.

We prefer to arrange the rods which form the thermostat inside of a casing 20 open at its upper end and provided at its lower end with ports 21 which admit air into said casing, the casing being provided with a sliding valve 22 which regulates the quantity of air that passes into the lower end of the casing 20 through the ports therein. The pipe 14 enters the lower end of the casing 20 and when the exhaust steam rushes into said casing it will ascend and thus create a draft that draws air into the casing through the ports 21, said air acting to cool off the thermostat. The casing 20 is provided with a discharge pipe 23 through which the water from the pipe 14 flows, said discharge pipe preferably being provided with an S-strap 24 that forms a water seal which prevents air from entering the casing through the discharge pipe.

The devices which the actuating lever 7 operates for imparting movement to the stem of the steam valve 4 consist of a rock arm 25 loosely mounted on a stub shaft 26 carried by a frame B to which the casings for the steam valve and water valve are connected. A rod 27 is pivotally connected to the outer end of the rock arm 25 and extends upwardly between jaws 7ª on the actuating lever 7. Collars 28 and 28ª are loosely mounted on the rod 27 on the upper and lower sides of the lever 7 and coiled springs 29 and 29ª, which surround said rod, are interposed between said collars and collars 30 and 30ª that are fastened to the rod 27 adjacent its upper and lower ends, as shown clearly in Fig. 3. The rock arm 25 is provided with a pair of laterally projecting lugs 31 and 31ª that are adapted to engage and move an operating member consisting of an arm 32 loosely mounted on the valve stem 4ª and having its upper end pivotally connected to a guide rod 33 that passes through a stationary guide 34 on the frame B. A coiled expansion spring 35 which surrounds the rod 33 is interposed between a stationary collar 36 on the lower end of said rod and a movable collar 37 on the upper end of said rod, said movable collar being beveled on its upper side so as to produce a fulcrum tooth 37ª which bears against the underneath side of the guide 34 through which the rod 33 extends. An approximately V-shaped device 38 is connected to the valve stem 4ª and the legs of said device are provided with laterally projecting lugs 39 and 39ª that are adapted to be engaged by the arm 32 of the operating member to close and open the steam valve 4. The frame B is provided with stops 40 and 40ª and when the steam valve is open the lug 39 of the V-shaped device that is connected to the stem of said steam valve will rest on the stop 40. When the steam valve is closed the lug 39ª of said device will rest on the stop 40ª.

When the actuating lever 7 moves downwardly the rock arm 25 will be depressed and the lug 31 on said arm will engage the arm 32 of the operating member and move it in the direction indicted by the arrow in Fig. 3. The first portion of the movement of arm 32 moves the rod 33 upwardly and compresses the spring 35 and when said arm 32 passes its dead center the spring 35 will expand and thus complete the movement of the arm 32 in the direction indicated by the arrow in Fig. 3, thus causing said arm to strike the lug 39ª on the V-shaped device 38 and impart a quick movement to the valve stem 4ª so as to open the steam valve. When the actuating lever 7 is moved upwardly by the contraction of the thermostat rods the rock arm 25 will be elevated and thus cause the lug 31ª thereon to move the arm 32 of the operating member in the opposite direction to that indicated by the arrow in Fig. 3. The first portion of the movement of said arm 32 in this direction will compress the spring 35 and when said arm passes its dead center the spring 35 will expand and complete the movement of the arm 32 in this direction, said arm engaging the lug 39 on the V-shaped device on the valve stem and imparting a sudden movement to the valve stem 4ª so as to open the steam valve.

The water valve 19 is of substantially the same construction as the steam valve and is provided with a stem 41 having a laterally projecting arm 42 on which a weight 43 is mounted, said weight operating to hold the water valve closed. The means for turning the stem 41 of the water valve to open said valve consists of an extension 25ª on the rock arm 25 and a rod 44 pivotally connected to the outer end of said extension and provided with a projection or rigid collar 45 which engages the arm 42 on the stem of the water valve and raises said arm when the rock arm 25 moves in the direction indicated by the arrow in Fig. 3 to close the steam valve. When the rock arm 25 is moved in the opposite direction to open the steam valve the weight 43 on the arm 42 will restore said arm to its normal position and thus close the water valve. The main advantage of a valve-operating mechanism of this description is that it does not allow one operation to interfere with the following operation. For example, if we are discharging air from the cylinder the steam valve does not start to close when a small amount of heat is applied to the thermostat rods, but the steam must expand these rods their full stroke and the spring 35 must be compressed to full compression before the steam valve closes. This provides sufficient time for the air to be completely discharged from the cylinder and when the arm 32 passes dead center the spring 35 expands and thus causes the steam valve to close. The next operation is to condense the steam which has been admitted to the cylinder and the steam valve must remain closed until this is done. The thermostat starts to contract at the same time the steam commences to condense and this contraction of the thermostat is transmitted to the spring 35 which is compressed to its full compression before the steam valve opens, the time it takes to compress the spring 35 providing sufficient time for the steam in the cylinder to condense completely. Thus, it will be seen that the time the valve-operating mechanism travels prior to the time that the valve actually closes or opens, performs two essential requirements; namely, (1) it allows time for completely filling the vacuum tank with steam before the valve closes and time to completely condense all of said steam before the valve opens on its return stroke; (2) it stores power in a suitable device, between the time the valve mechanism starts moving and the time the opening or closing of the valve actually takes place, for completing the work of opening or closing said valve. Another advantage of a valve-operating mechanism of this construction is that it imparts a quick and sudden movement to the valves, the first portion of the movement of the rock arm 25 storing up energy in the spring 35 of the operating member that imparts movement to the valve stem so that when the arm 32 passes dead center said spring can expand and thus give the arm a quick stroke so as to open or close the valves instantaneously.

The object of interposing a spring 29ª between the underneath side of the actuating lever 7 and the rock arm 25 is that when said lever moves downwardly to close the steam valve said spring 29ª will be compressed slightly during the first portion of the movement of said lever and thus store up energy that is exerted on the rock arm 25 at the time the collar 45, connected to said arm, engages the arm 42 of the water valve stem.

In view of the fact that the cooling off of the thermostat causes the steam valve to open we have provided means for preventing the steam valve from being opened in case the thermostat should cool off before the vacuum in the tank has been destroyed, thereby eliminating unnecessary movements of the valve-operating mechanism. To accomplish this we employ a bellows which consists of two diaphragms 46 and 47 spaced away from each other and having their edge portions connected together. A pipe 48, which passes through the lower diaphragm 47, leads into the tank A so that the vacuum in said tank will contract said bellows and thus move the diaphragm 46 downwardly. The top diaphragm 46 is provided with a vertically disposed rod 49 that passes through a guide on the frame B, and a coiled spring 50 is arranged on said rod between said guide and an adjustable collar 51 at the upper end of the rod 49. A locking device 52 is pivotally connected to the frame B and is provided with an arm having a bifurcated end which receives a pin 53 on the rod 49, as shown in Fig. 3, so that when the bellows is contracted and the rod 49 moves downwardly, the locking device 52 will move in the direction indicated by the arrow X in Fig. 3, and thus lie in the path of movement of a lug 54 on the end of the rock arm 25 so as to prevent said arm from moving upwardly far enough to open the steam valve. This locking device will not prevent the actuating lever 7 from moving upwardly, however, when the thermostat cools off or contracts, and as said actuating lever 7 moves upwardly it will compress the spring 29 and store up energy in said spring. When the vacuum in the tank A is broken or falls below a certain degree the expansive force of the bellows spring 50 will expand the bellows and thus move the locking device in the opposite direction to that indicated by the arrow X in Fig. 3 so as to carry said locking device out of engagement with the lug 54 on the rock arm 25. The spring 29 will then expand and thus move the rock arm 25 upwardly so as to actuate the valve-operating arm 32 to open the steam valve. The locking device 52 is so proportioned that it will not arrest the upward movement of the rock arm 25 until after said arm has moved far enough to carry the collar 45 or projection on the rod 44 out of engagement with the arm 42 on the stem of the water valve so that the weight 43 can close said water valve, thereby causing the water valve and steam valve to remain closed at the same time. By adjusting the collar 51 on the bellows rod 49 we can vary the tension of the spring 50 and thus cause the bellows to be contracted by vacuums of different degree.

While we have herein shown a thermostat consisting of a number of metal rods connected to each other and to the actuating lever 7 in such a manner that the expansion of said rods will permit said lever to move downwardly, we do not wish it to be understood that our broad idea is limited to such a construction as other types of thermostats could be used for controlling the actuating lever 7 without departing from the spirit of our invention. Furthermore, while we have herein shown the pump as comprising means for introducing a spray of water onto the steam in the cylinder A to cause it to condense quickly and a spray of water onto the thermostat to cause it to cool quickly, this feature is not absolutely necessary to the successful operation of our pump and could be omitted if desired.

One great advantage of a pump of the character above described is that low-pressure steam can be utilized for creating a vacuum in the cylinder and also actuating the valve-operating mechanism as the latent heat in the steam is employed for primarily imparting movement to the valve-operating mechanism. Another advantage of a pump of this description is that the valve which controls the admission of steam to the cylinder is not timed to operate at any certain period so that we are able to draw a charge of air into the cylinder which can be discharged therefrom quickly and then a charge of water which takes much longer to flow out of the cylinder. In other words, with a pump of this description the closing of the steam valve is determined by the character of the substance that is drawn into the cylinder for as soon as the steam exhausts from the cylinder and strikes the thermostat the valve which controls the admission of steam will close. The closing and opening of the steam valve also depends upon the pressure of steam used as either air or water will be discharged much quicker with ten pounds of steam pressure than with ten ounces of steam pressure. Furthermore, the time of opening of the steam valve depends upon the intensity of the cooling medium, for if we use cold water for condensing the steam and cooling the thermostat it will require, say, thirty seconds to create the vacuum, while if the pump was located in a warm place and no water used to cool off the thermostat or condense the steam, it would probably take five minutes to create the vacuum. Thus, it will be seen that the pump automatically takes care of the most varied conditions of steam pressure and the cooling medium given it and maintains an even tension or vacuum.

Having thus described our invention, what we claim as new and desire to secure by Letters Patent is:

1. A vacuum pump comprising a tank or cylinder provided with an inlet opening, an outlet opening through which the contents of said cylinder is discharged, a valve for admitting steam into said cylinder to discharge the contents thereof and also create a vacuum therein, and means arranged in the path of the steam that exhausts from said outlet opening and adapted to be operated by the heat of said exhaust steam for actuating said valve to cut off the supply of steam to the cylinder; substantially as described.

2. A vacuum pump comprising a tank or cylinder provided with an inlet opening, an outlet opening through which the contents of said cylinder is discharged, a valve for admitting steam into said cylinder to discharge the contents thereof and create a vacuum therein, and a thermostat arranged in the path of the steam that exhausts through said outlet opening and adapted to be operated by the heat of said steam for moving said valve to cut off the supply of steam after the contents of said tank has been discharged; substantially as described.

3. A vacuum pump comprising a tank or cylinder provided with an inlet opening, an outlet opening through which the contents of said tank is discharged, a valve for controlling the admission of steam to said tank for discharging the contents of the tank and also creating a vacuum therein, and mechanical means for positively closing said valve, said means being so constructed that the valve cannot close until after the entire contents of said tank has passed through said outlet opening irrespective of the time it takes to discharge said contents; substantially as described.

4. A vacuum pump comprising a tank or cylinder provided with an inlet opening and an outlet opening, a valve for admitting steam into said cylinder to displace the contents thereof and also create a vacuum in said cylinder when said steam condenses, controlling means for said valve adapted to be operated by heat and arranged in such a position that it will be acted upon by the steam that escapes through the outlet opening of the cylinder after the contents of the cylinder has been discharged, and means independent of said controlling means for causing said valve to remain closed so long as a certain vacuum exists in the cylinder; substantially as described.

5. A vacuum pump comprising a tank or cylinder provided with an inlet and an outlet opening, a valve for admitting steam into said cylinder to discharge the contents thereof and create a vacuum in said cylinder, mechanism for operating said valve, a thermostat adapted to be operated on by the steam that exhausts from said cylinder for actuating said valve-operating mechanism, and means independent of the valve-operating mechanism for causing said valve-operating mechanism to remain at rest so long as a certain vacuum exists in the cylinder; substantially as described.

6. A vacuum pump comprising a tank or cylinder provided with an inlet and an outlet opening, a valve for admitting steam into said cylinder, a thermostat adapted to be acted upon by the steam that exhausts from said cylinder for controlling the movements of said valve, and automatically operated means controlled by said thermostat for introducing a cooling medium onto the thermostat and into the tank to cause the thermostat to cool off quickly and the steam in said tank to condense quickly; substantially as described.

7. A vacuum pump comprising a tank or cylinder provided with an inlet and an outlet opening, a valve for admitting steam into said cylinder, a valve for admitting water into said cylinder to cause said steam to condense quickly, mechanism for opening and closing both of said valves automatically, and means operated by the heat from the steam that exhausts from said cylinder after the contents of the cylinder has been discharged for controlling said valve-operating mechanism; substantially as described.

8. A vacuum pump comprising a tank or cylinder, a discharge pipe leading from said cylinder and provided with a check-valve, a suction pipe communicating with said cylinder, a valve for admitting steam into said cylinder to displace the contents thereof and create a vacuum in the cylinder, mechanism for moving said valve to open and close it, and a thermostat for imparting movement to said valve-operating mechanism and arranged in such a position that it will be heated by the steam that exhausts through said discharge pipe after the entire contents of the tank has passed through said discharge pipe; substantially as described.

9. A vacuum pump comprising a tank or cylinder provided with an inlet and an outlet opening, a valve for admitting steam into said cylinder to discharge the contents thereof and create a vacuum in said cylinder, a valve-operating mechanism comprising an actuating lever and devices which transmit the movements of said lever to the stem of said valve so as to open and close said valve, and a thermostat for moving said actuating lever in opposite directions, said thermostat being arranged in such a position that it will be acted upon by the steam that passes out of the cylinder after the entire contents of the cylinder has been discharged; substantially as described.

10. A vacuum pump comprising a tank or cylinder provided with an inlet opening, an outlet opening in the lower end of said tank through which the contents thereof is discharged, a valve for admitting steam into said cylinder, mechanism for operating said valve, a thermostat arranged in the path of the steam that escapes through said discharge opening for controlling said valve-operating mechanism, and a casing surrounding the thermostat and provided at its upper and lower ends with openings that cause a current of air to circulate over the thermostat to cool it off quickly; substantially as described.

11. A vacuum pump comprising a tank or cylinder provided with an inlet opening and a discharge pipe through which the contents of said cylinder passes, a casing into the lower end of which said discharge pipe extends, a thermostat arranged inside of said casing, means for admitting air into the lower end of said casing, a valve for admitting steam into said cylinder, and means operated by said thermostat for controlling the movements of said valve; substantially as described.

12. A vacuum pump comprising a tank or cylinder provided with an inlet opening, a discharge pipe leading from said cylinder, a valve for admitting steam into said cylinder, a casing communicating with said discharge pipe and having one of its ends open so that the steam which exhausts into said casing through said discharge pipe will rush to the open end of said casing, a thermostat arranged inside of said casing for controlling the movements of said valve, and means for admitting air into the closed end of said casing for cooling off the thermostat after it has been heated by said exhaust steam; substantially as described.

13. A vacuum pump comprising a tank or cylinder provided with an inlet and an outlet opening, a valve for admitting steam into said cylinder to create a vacuum therein, an independent valve for admitting water into said cylinder to cause said steam to condense quickly, automatic means for moving both of said valves so as to cause one valve to open when the other closes, and means for causing both of said valves to remain closed so long as a certain vacuum exists in the cylinder; substantially as described.

14. A vacuum pump comprising a tank or cylinder provided with an inlet and an outlet opening, a valve for admitting steam into said cylinder to create a vacuum therein, mechanism for operating said valve, a bellows adapted to be contracted by the vacuum in said cylinder, and a device operated by said bellows which holds the valve-operating mechanism locked so long as a certain vacuum exists in said cylinder; substantially as described.

15. A valve mechanism comprising an oscillating valve provided with a stem, a device rigidly connected to said stem, an operating member for said stem consisting of two devices pivotally connected together to form a toggle and a spring mounted on one of said devices, and automatic means for straightening said toggle to compress said spring and thereafter permit said spring to expand and thus cause the toggle to engage the device on the valve stem so as to impart a sudden movement to the valve; substantially as described.

16. A valve mechanism comprising an oscillating valve having a stem which is provided with a plurality of arms, an oscillating device interposed between said arms, a guide rod pivotally connected to said device and passing through a stationary guide, a spring surrounding said rod for actuating said device to force it into engagement with one of said arms and thus impart movement to the valve stem, and means for moving said device to compress said spring and then permit it to expand; substantially as described.

17. A valve mechanism comprising an oscillating valve having a stem that is provided with a pair of rigid arms, an oscillating device arranged between said arms, a rod pivotally connected to the upper end of said device, a coiled expansion spring arranged on said rod between a stationary collar thereon and a stationary abutment through which the rod passes, and means for moving said device to compress said spring and then permit said spring to expand so as to force said device into engagement with one of the arms on the valve stem; substantially as described.

18. A valve mechanism comprising a valve having a stem that is provided with a pair of rigid arms, an oscillating device which is adapted to engage said arms to move the valve stem in opposite directions, a spring coöperating with said device, and an automatically operated rock arm for moving said device in opposite directions, the first portion of the movement of said oscillating device operating to compress said spring so that said spring can impart movement to said device after it has reached a certain position; substantially as described.

19. A valve mechanism comprising a valve having a stem that is provided with rigid arms, an oscillating device arranged between said arms and adapted to engage same to move the valve stem, a spring coöperating with said device, an automatically operated rock arm for moving said device in opposite directions, the first portion of the movement of said oscillating device operating to compress said spring so that said spring can impart movement to said device after it has reached a certain position, and stops which coöperate with the arms on the valve stem to limit the movement of the valve; substantially as described.

20. A valve mechanism comprising an oscillating valve provided with a stem having a pair of rigid arms, an oscillating device arranged between said arms, a rod pivotally connected to the upper end of said device and projecting through a stationary guide, a coiled expansion spring interposed between a stationary collar on said rod and a movable collar that engages said guide, and an automatically operated rock arm provided with a pair of lugs that alternately engage said oscillating device and move it in opposite directions; substantially as described.

21. A valve mechanism comprising an oscillating valve having a stem that is provided with a pair of arms, an oscillating device arranged between said arms for actuating same to open and close the valve, a spring coöperating with said device for imparting movement thereto after said device has reached a certain position, a rock arm for moving said oscillating device in opposite directions, an automatically operated actuating lever for moving said rock arm in opposite directions, and yielding members interposed between said actuating lever and rock arm for transmitting the movements of said lever to said rock-arm; substantially as described.

22. A valve mechanism comprising a plurality of oscillating valves, a pair of arms on the stem of one of said valves, an oscillating device coöperating with said arms to open and close the valve, a spring for imparting a quick and sudden movement to said device, a rock arm for moving said device to compress said spring, and means on said rock arm for imparting movement to the stem of the second valve; substantially as described.

23. A vacuum pump comprising a tank or cylinder provided with an inlet and an outlet opening, a valve for admitting steam into said cylinder to create a vacuum therein, mechanism for operating said valve, and means independent of said mechanism whereby the vacuum in said cylinder controls the time of operation of said valve-operating mechanism; substantially as described.

24. A vacuum pump comprising a tank or cylinder provided with an inlet and an outlet opening, a valve for admitting steam into said cylinder to create a vacuum therein, mechanism for operating said valve, and means independent of said mechanism and controlled by the vacuum in said cylinder for preventing said valve-operating mechanism from actuating the valve so long as a certain vacuum exists in the cylinder; substantially as described.

25. A vacuum pump comprising a tank or cylinder provided with an inlet and an outlet opening, a valve for admitting steam into said cylinder to discharge the contents thereof and create a vacuum therein, a thermostat adapted to be operated on by the steam that exhausts from said cylinder for actuating said valve, means for introducing a cooling medium onto said thermostat to cause it to cool off quickly, and means for regulating the quantity of cooling medium that is introduced onto said thermostat; substantially as described.

26. A vacuum pump comprising a tank provided with an inlet and an outlet opening, a valve for admitting steam into said cylinder to discharge the contents thereof and create a vacuum therein, mechanism for imparting movement to said valve to open and close it, a thermostat adapted to be acted upon by the steam that exhausts from said cylinder for imparting movement to said valve-operating mechanism, and means for permitting said valve-operating mechanism to move a certain distance before the valve is operated on; substantially as described.

27. A vacuum pump comprising a cylinder provided with an inlet opening and an outlet opening, a valve for admitting steam into said cylinder to discharge the contents thereof and create a vacuum therein, a thermostat adapted to be acted upon by the steam that exhausts from said cylinder for controlling said valve, and mechanical means for transmitting the movements of the thermostat directly to said valve, said means being so constructed that the thermostat can expand or contract before the valve is operated; substantially as described.

28. A vacuum pump comprising a cylinder provided with an inlet opening and an outlet opening, a valve for admitting steam into said cylinder to discharge the contents thereof and create a vacuum therein, a thermostat adapted to be acted upon by the steam that exhausts from said cylinder, and a valve-moving mechanism actuated by said thermostat and being so constructed that the contraction or expansion of the thermostat stores up sufficient energy in same to move the valve into its open or closed position; substantially as described.

In testimony whereof, we hereunto affix our signatures, in the presence of two witnesses, this 15th day of April, 1908.

JAMES L. SPARKS.
EDWARD R. EDDINS.

Witnesses:
WELLS L. CHURCH,
GEORGE BAKEWELL.